Patented May 11, 1937

2,079,715

UNITED STATES PATENT OFFICE 2,079,715

PROCESS AND BATCH FOR MAKING CERAMIC BODIES

Gordon R. Pole, Creighton, Pa., assignor to Pittsburgh Plate Glass Company, a corporation of Pennsylvania No Drawing. Application May 9, 1933, Serial No. 670,214

6 Claims. (Cl. 106—9)

My invention relates to a process and batch for producing a ceramic body which, while especially suitable for use in lining glass melting tanks, pots, and other like containers, because of its superior resistance to the corrosive action of glass, is also suitable for use wherever a refractory material capable of resisting the corrosive action of molten glass or hot vapors or glass batch materials is desired.

It has long been recognized that minerals of the sillimanite group, such as cyanite and sillimanite, are resistant to the action of molten glass attack or the fumes thereof, but in most cases, unless these minerals are burned to extremely high temperatures, 3000 deg. F. or above, or are actually melted and cast in a molten condition, they have a tendency in service in a glass tank to be washed out of the refractory due to the failure of the bond and appear as stones in the glass. The general practice of using material of this type, especially cyanite and sillimanite, has been to first calcine them in order to eliminate the excessive expansion which occurs during the burning. This expansion of natural cyanite is referred to by Albert B. Peck in his article in the Journal of the American Ceramic Society, vol. 8, p. 427, 1925, entitled "Changes in the Constitution and Microstructure of Andalusite, Cyanite and Sillimanite at High Temperatures and Their Significance in Industrial Practice." Raw sillimanite minerals of the above character have also been employed in certain refractories to counteract the shrinkage during the various burning stages. The present invention, however, does not contemplate the use of this feature, but on the contrary, the raw sillimanite minerals, especially cyanite and sillimanite, are used to produce a dense homogeneous body with a low apparent porosity of 15 per cent or less which upon burning at commercially obtainable temperatures, Cone 15 (2570 deg. F.) to Cone 20 (2768 deg. F.), has an appreciable amount of shrinkage.

After repeated experiments and tests I have found that by reducing these crude natural sillimanite minerals, especially raw cyanite and sillimanite, to pass a 100 mesh standard sieve or finer, and then combining them in various proportions with a number of types of clays, such as ball clays and kaolins, and then burning the resultant body to Cone 15 to 20, has a very marked tendency to remove the excessive expansion and in some cases actual shrinkage occurs. By this means a very dense homogeneous crystalline structure with a low apparent porosity of 15 per cent or less is produced which is composed of interlocking aggregates of minute mullite crystals with interstitial siliceous glass between crystals which is highly viscous at elevated temperatures (Cone 15 to Cone 20). The physical nature of the crystalline material has been determined by examining thin sections and powdered fragments of the burned body. The crystals when examined petrographically by immersion methods gave an average index of refraction of 1.64. To illustrate the effect of such treatment, I will give as an example the result of an experiment in using a (10 to 100 mesh standard sieve) raw Indian cyanite with 15 per cent clay and a similar body composed of raw Indian cyanite ground to pass a 100 mesh standard sieve and 15 per cent of the same clay. These bodies were both burned to Cone 20 (about 2768 deg. F.).

Body #1—Raw Indian cyanite (10-100 mesh) 85%, clay 15%____ 4.0% expansion

Body #2—Raw Indian cyanite (thru 100 mesh) 85%, clay 15%____ 1.25% shrinkage

Change in length

It can be seen from the above example that the coarse raw cyanite in Body #1 caused an ultimate expansion of 4%, while in Body #2, the use of 100 mesh raw cyanite caused an ultimate shrinkage of 1.25%.

It has also been found by further experimentation that by increasing the clay content from 15 to 60 per cent in the above 100 mesh raw natural cyanite or sillimanite bodies, together with small additions (0-5%) of alkaline or alkaline earth fluxes caused excessive firing shrinkage, but at the same time, it produced a body with a denser structure at a lower maturing temperature without destroying the homogeneous interlocking crystalline mullite ($3Al_2O_3 2SiO_2$) nature of the body and without decreasing its resistance to the corrosive action of molten glass. Bodies of this type have been produced at Cone 18 with a porosity under 3 per cent.

In order to produce a ceramic body by employing the principles outlined above that can be utilized for commercial sized glass refractories, it was found necessary, due to the drying and burning difficulties encountered, to first prepare a burned grog by the above method, and then by subsequent grinding and sizing, to combine varying percentages of the grog, 40 to 85 per cent, with varying percentages of a raw bond, 15 to 60 per cent, the bond being composed of identical materials and in exactly the same proportions as used to compound the grog. By this means a body is produced, after firing, in which the grog particles are surrounded by a bond that is identically the same in chemical composition and physical characteristics and the final product exhibits an extremely dense homogeneous structure of minute mullite crystals embedded in a highly siliceous glass. The identity of the grog particles is completely obliterated by this means. Bodies of this type can be formed with these materials by any of the common ceramic means, such as hand pressing, mechanical extrusion, dry pressing or the slip casting process.

I give as a specific example of a body produced by this means, which is made from a mixture of 4.75 parts of a dense burning refractory clay, such as Tennessee Ball Clay #5, 4.75 parts of an 80–85% commercial raw cyanite passing a 100 mesh sieve and 0.5 part of a 200 mesh commercial feldspar. The composition of these ingredients is indicated in the following table which gives analysis of typical samples.

|  | Tenn. Ball Clay #5 | Raw cyanite (80-85%) | Feldspar |
|---|---|---|---|
| $SiO_2$ | 47.92 | 45.28 | 71.09 |
| $Al_2O_3$ | 35.86 | 53.07 | 15.75 |
| $Fe_2O_3$ | .95 | .35 | .59 |
| $TiO_2$ | .99 | .08 | .04 |
| CaO | .25 | .77 | .60 |
| MgO | .08 | .12 | .15 |
| $Na_2O$ |  |  | 3.21 |
| $K_2O$ |  |  | 7.75 |
| Loss | 13.88 | .16 | .68 |
|  | 99.93 | 99.83 | 99.96 |

A grog is first produced by mixing these materials in the proportions and gradings given above. The raw ingredients are mixed as thoroughly as possible in the presence of water and a small amount of electrolyte either by blunging, pugging or other approved methods so as to produce an intimate mixing of the materials. The mixed batch is then formed into pieces suitable for handling and after are calcined to a temperature of Cone 18 or approximately 2705 deg. F.

The calcined grog material is then broken down to suitable fines to serve as grog material in forming the ceramic body. It has been found by experiment that if the grog is reduced to two given grades; namely, one grade passing a 10 mesh standard sieve and remaining on a 30 mesh standard sieve, and the other grade all passing a 100 mesh standard sieve, a body with satisfactory working properties and maximum density can be produced by using varying proportions of these two graded grogs together with given percentages of the raw bonding material. The binding mixture is made from the same raw ingredients used in making the grog and in the same proportions as given above; namely, 4.75 parts raw cyanite passing a 100 mesh sieve, 4.75 parts of ball clay and 0.5 part of a 200 mesh commercial feldspar. The combining of the two different sizes of ground particles, as above set forth, gives the product a much greater density at a lower fusing temperature. It also permits of a much smaller proportion of combining material (clay) than is the case if the material is all ground to the fine size. A further result due to the use of these two sizes is the making of an article which is stronger before the firing operation so that it is more practical in making large bodies, such as tank blocks, which are liable to break in handling before they are fired. The lower percentage of binding clay which may be used as a result of the combining of the two sizes of particles is desirable as it reduces shrinkage in firing. In some cases, the shrinkage may be excessive and this is counteracted by the use of a proportion of coarser material. As a result of this feature of novelty, it is possible to make a product using only 15 or 20 per cent of clay, which product will still have the necessary strength. The bonding material and grog are mixed in suitable proportions, for example, 40 per cent bond and 60 per cent grog. The composition of the body made by this means would be as follows:

|  | Per cent |
|---|---|
| Grog (10–28 mesh sieve) | 40 |
| Grog (thru 100 mesh sieve) | 20 |
| 80–85% raw cyanite (thru 100 mesh) | 19 |
| Ball clay | 19 |
| Feldspar (200 mesh) | 2 |
|  | 100 |

The mixture thus made is formed into the desired shapes by any of the common ceramic means, such as hand pressing, mechanical extrusion, dry pressing or slip casting. The blocks, or other articles are then dried and fired to a temperature of Cone 18 or about 2705 deg. F. The ultimate composition of the finished article will vary somewhat with the purity of the materials used and upon the proportions used in making the grog. An approximate chemical composition of the ceramic body is as follows:

|  | Per cent |
|---|---|
| $SiO_2$ | 51.20 |
| $Al_2O_3$ | 46.10 |
| $Fe_2O_3$ | .97 |
| $TiO_2$ | .55 |
| CaO | .55 |
| MgO | .12 |
| $Na_2O$ | .17 |
| $K_2O$ | .40 |
| Total | 100.00 |

Ceramic articles of the above analysis when burned to Cone 18 have an apparent porosity of 1.5 per cent while the average apparent porosity of commercial clay tank block will be 20 per cent or over. The apparent porosity of this ceramic body can be varied within wide limits, depending upon the proportioning of the grog and bonding material and upon the temperature to which the article is burned.

As stated above, it was found by tests that this ceramic body was especially resistant to the corrosive action of molten glass and highly superior to an average good commercial clay glass refractory. This is indicated by tests made by immersing 2½ x 4 x 9″ test brick in a molten glass batch maintained at a constant temperature of 2600 deg. F. for a period of 72 hours. During the test, the molten glass flows past the face of the bricks and a constant level of the glass is maintained by the addition of raw glass batch at regular intervals of time. In making comparative tests, the two bricks to be tested are placed in the same relative position in the glass tank and both the bricks are run at the same time under identical conditions. This method gives a closer actual comparative resistance to glass attack than any method so far devised. The extent of the corrosion is measured by a difference of the weight losses after test. Tests conducted by the above method on a ceramic body of this type, a molten cast mullite refractory, and a good average clay glass refractory gave the following results:

```
                                    Per cent weight loss
                                     after 72 hr. test
Ceramic body_____  6.0
Molten cast mullite block_____  6.5
Average good clay glass refractory_____ 12.5
```

In the above specific example cited, it is to be understood that other materials similar in chemical composition and physical properties, to those disclosed, can be substituted without materially changing the resultant product. The feldspar cited in the specific example acts as a flux and it will be understood that other suitable alkalies or alkali earth fluxes may be employed. Also that with less refractory clays, the flux may be omitted.

It is also to be understood that the raw sillimanite minerals cited in the above specific example includes those high expanding sillimanite minerals that have been superficially heat treated without materially removing any appreciable amount of expansion.

The ceramic body described herein differs radically from the numerous commercial glass refractories which have been prepared in recent years in that the body is composed of a very dense, interlocking homogeneous aggregate of mullite crystals surrounded by a highly siliceous glass and that by means disclosed, this is produced at commercially obtainable temperatures (2570 to 2768 deg. F.). Also the grog material used in compounding the body completely loses its identity in the burned product and is recrystallized with the bonding material. The phrase "minerals of the sillimanite group showing high expansion on burning" is intended to cover cyanite as well as sillimanite proper and any other minerals of the same group having the same general composition and high expansion on burning or calcining.

What I claim is:

1. A batch mixture for a ceramic body which is highly resistant to molten glass attack, comprising a dense burned homogeneous mullite grog made from a raw mineral of the sillimanite group having a high expansion on burning and fine enough to pass through a sieve of about 100 mesh, and a dense burning refractory clay, and a raw bonding material for the grog of substantially the same physical and chemical composition as the material from which the grog is made.

2. A batch mixture for a ceramic body which is highly resistant to molten glass attack, comprising a dense burned homogeneous mullite grog made from a raw mineral of the sillimanite group having a high expansion on burning and fine enough to pass through a sieve of about 100 mesh, and a dense burning refractory clay, said grog being ground into two sizes, one of which will pass through a 100 mesh standard sieve and the other of which is much coarser, and a raw, bonding material for the grog having substantially the same physical and chemical composition as the material from which the grog is made.

3. A batch mixture for a ceramic body which is highly resistant to molten glass attack, comprising a dense burned homogeneous mullite grog made from a raw mineral of the sillimanite group having a high expansion on burning and fine enough to pass through a sieve of about 100 mesh, and a dense burning refractory clay, said grog being ground into two sizes, one of which will pass through a 100 mesh standard sieve and the other of which will remain on a 30 mesh standard sieve, and a raw bonding material for the grog of substantially the same physical and chemical composition as the material from which the grog is made.

4. A batch mixture for a ceramic body which is highly resistant to molten glass attack, comprising a dense burned homogeneous mullite grog made from a raw mineral of the sillimanite group having a high expansion on burning and fine enough to pass through a sieve of about 100 mesh and a dense burning refractory clay, said grog being ground into two sizes, one of which will pass through a 100 mesh standard sieve and the other of which will remain on a 30 mesh standard sieve, and a raw bonding material for the grog of substantially the same physical and chemical composition as the material from which the grog is made, the grog and bonding material being in substantially equal parts.

5. A method of making a ceramic body which is highly resistant to molten glass attack, which consists in mixing a finely divided grog with a bonding material and firing the same at temperatures ranging from 2500 deg. F. to 2800 deg. F., said grog being made from a mineral of the sillimanite group having a high expansion on firing and fine enough to pass through a sieve of about 100 mesh and a dense burning refractory clay, and said bonding material having substantially the same physical and chemical composition as the material from which the grog is made.

6. A method of making a ceramic body which is highly resistant to molten glass attack, which consists in mixing a grog which is divided into two grades, one of which is fine enough to pass through a 100 mesh standard sieve and the other of which is much coarser, with a bonding material, and firing the same at temperatures ranging from 2500 deg. F. to 2800 deg. F., said grog being made from a mineral of the sillimanite group having a high expansion on firing and a dense burning refractory clay, and said bonding material having substantially the same physical and chemical composition as the material from which the grog is made.

GORDON R. POLE.